R. D. STEVENSON.
NUT LOCK.
APPLICATION FILED APR. 29, 1909.

950,123.

Patented Feb. 22, 1910.

Witnesses:
Chas. S. Lepley
Henry Sens

Inventor:
Ralph D. Stevenson
by C. M. Clarke
his attorney

UNITED STATES PATENT OFFICE.

RALPH D. STEVENSON, OF HUBBARD, OHIO.

NUT-LOCK.

950,123.     Specification of Letters Patent.     Patented Feb. 22, 1910.

Application filed April 29, 1909. Serial No. 492,899.

*To all whom it may concern:*

Be it known that I, RALPH D. STEVENSON, a citizen of the United States, residing at Hubbard, in the county of Trumbull and State of Ohio, have invented certain new and useful Improvements in Nut-Locks, of which the following is a specification, reference being had therein to the accompanying drawing.

My invention consists of an improvement in nut locks and has for its object to provide means consisting of a threaded bolt having oppositely arranged longitudinally tapered grooves, a locking washer having corresponding oppositely arranged inner bearing and locking lugs or keys, and a nut having edge recesses for engagement of the bent-up edge of the washer, constructed and adapted to operate in the manner hereinafter described.

Figure 1:
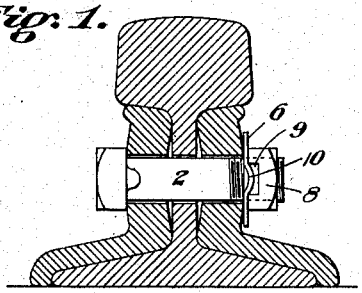
Figure 2:
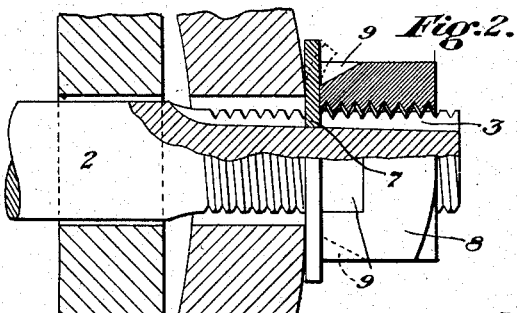
Figure 3:
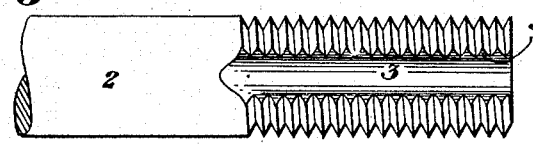
Figure 5:
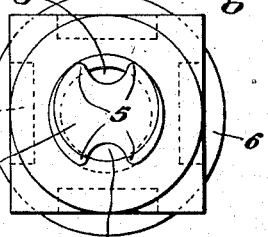
Figure 4:
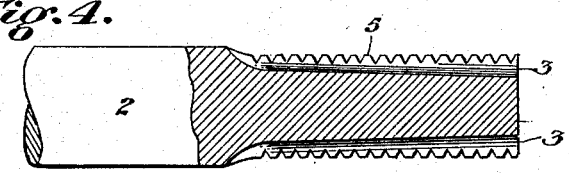
Figure 6:
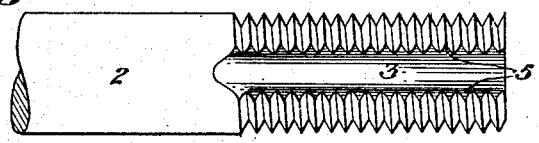
Figure 8:
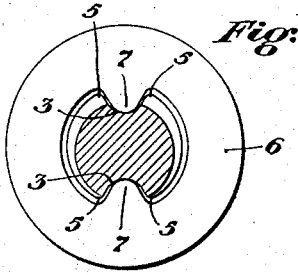
Figure 7:
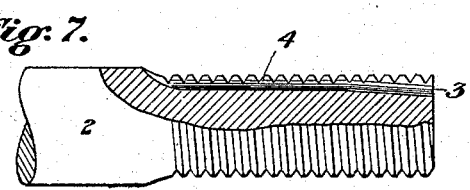
Figure 12:
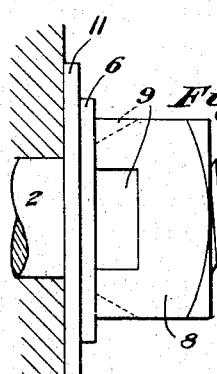
Figure 9:
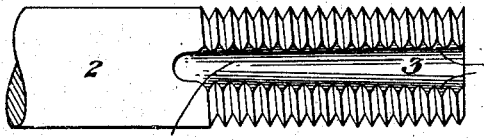
Figure 11:
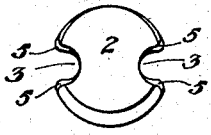
Figure 10:
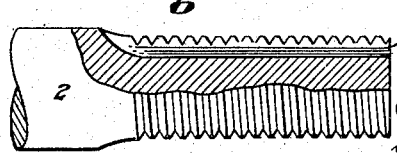

In the drawings:—Figure 1 is a cross section of a rail joint provided with my invention. Fig. 2 is an enlarged longitudinal sectional detail view showing the parts in position. Figs. 3 and 4 are views in elevation and section respectively of the threaded end of a bolt having oppositely tapered parallel-sided grooves. Fig. 5 is an end view of Fig. 3 showing the nut and washer in position. Figs. 6 and 7 are views similar to Figs. 3 and 4 showing initially tapered parallel-sided grooves. Fig. 8 is an end view of the bolt and face view of the washer in position thereon. Figs. 9 and 10 are views similar to Figs. 3 and 4 showing the oppositely arranged grooves having parallel bottoms and tapered sides. Fig. 11 is an end view of Fig. 9. Fig. 12 is a view showing the application of the invention to a wood surface, with an additional inner bearing washer.

The bolt 2 is a standard track or other bolt having the usual threads at one end and head at the other, with lugs under the head if desired, to prevent turning. In the construction shown in Figs. 3 and 4 the threaded end of the bolt is provided with oppositely located rounded grooves 3, 3, the bottoms of which taper outwardly and backwardly from the end, the sides of the grooves being parallel. In the forms shown in Figs. 6 and 7 the front portions of the grooves 3 are initially tapered in a similar manner and merge into substantially parallel bottoms 4, the sides being also parallel. In Figs. 9 and 10 the bottoms of the grooves 3 are parallel and the sides of the grooves taper backwardly and inwardly toward each other. In all constructions, the edges of the grooves are rounded or filleted as at 5, providing a smooth rounded finish for the thread terminals and for clearance of the similarly shaped washer, while the inner ends of the grooves vanish into the full diameter of the bolt as shown.

6 represents the locking washer, preferably circular, having a central aperture for the bolt, and at each side thereof inwardly extending rounded lugs or keys 7, 7, preferably merging into the aperture periphery by fillets, as shown.

8 is the nut of usual form, having one or more of its side faces undercut at the inner edge, as indicated at 9, preferably at an angle, to provide recesses for the bent-up edge of the washer.

In operation, the bolt having been inserted through the fish bars and rail web, or through any elements to be secured together by the bolt and nut, the washer is placed over the bolt, its lugs 7 engaging the grooves 3 and binding therein at the desired point. It is preferred that the lugs shall bind in the grooves slightly before the washer is set up tightly against the fish bar, so that it will oppose resistance to the nut independent of the resistance of the fish bar, requiring some force of the nut to set it completely back and under the full pressure of the nut.

The advantages of the equal oppositely tapered grooves and the corresponding interfitting washer lugs is that the washer is thus at all times equally spaced and centrally located on the bolt. Its inner edges are held free of engagement with the threads by reason of the washer aperture being slightly larger than the bolt, and the engagement by the lugs with the grooves causes it to always maintain such central position and to prevent rotation of the washer. As it is set up on the bolt by hand until it binds and the nut is applied to force it toward and against the opposite bearing surface, the resistance to the nut will gradually increase, due to the tapered grooves, so that I thus provide for an independent resisting friction which will remain undiminished if the resistance of the bolted element, as the fish bar, should for any reason decrease. The nut will therefore continue to bear against the washer with binding friction, and the washer will be maintained centrally on the bolt and against rotation, until the nut is reversed, and this action will be quite independent of the presence beyond the washer of the bolted element.

For the purpose of preventing reverse rotation and loosening of the bolt, the washer is bent up at its edges by a suitable tool into one or more of the spaces 9 as indicated in dotted lines in Fig. 2, thereby firmly engaging the nut against rotation, as shown at 10 in Fig. 1.

When it is desired to use the device with wood or other yielding material, a supplemental ordinary washer 11 is first set against the surface to be bolted, said washer being slightly greater in diameter than washer 6, thus providing a bearing surface for the back of the swaging tool for bending up the washer 6.

When desired to remove the nut, the bent up ear 10 may be flattened in the same manner by inserting the end of the tool against it in recess 9 and driving it back to the original position.

It will be understood that washer 6 will be centralized and bear by its lugs 7 in the groove 3 of whatever construction, i. e., whether tapered along the bottom of the groove or along its sides, the full desired effect being secured with either and the washer being maintained centrally on the bolt and providing independent resistance for the nut.

The invention provides a simple, strong and effective means for the purpose in view. It is cheap to construct, will not get out of order, and in service has fully demonstrated its efficiency in the manner described.

Having described my invention, what I claim is:—

1. The combination of a threaded bolt having oppositely arranged longitudinally tapered rounded grooves, a locking washer having correspondingly shaped inwardly extending lugs engaging said grooves and intervening interior annular edges spaced away from the outer circumference of the bolt, and a nut having portions adapted to be engaged and held by bent-up portions of the washer, substantially as set forth.

2. The combination of a threaded bolt having oppositely arranged longitudinally tapered rounded grooves, a locking washer having correspondingly shaped inwardly extending lugs engaging said grooves and intervening interior annular edges spaced away from the outer circumference of the bolt, a supplemental bearing washer set underneath said washer, and a nut having portions adapted to be engaged and held by bent-up portions of the first named washer, substantially as set forth.

3. The combination of a threaded bolt having oppositely arranged longitudinally tapered rounded grooves, a locking washer having a central opening and oppositely arranged inwardly extending lugs engaging the bottoms of said grooves and maintaining the washer centrally on the bolt with intervening clearance between the lugs, and a nut adapted to force the washer inwardly to cause the lugs to bind in said tapered grooves equally at each side, said nut having undercut recesses at its inner corners adapted to receive bent-up portions of the washer, substantially as set forth.

In testimony whereof I affix my signature in presence of two witnesses.

RALPH D. STEVENSON.

Witnesses:
C. M. CLARKE,
HARRY M. WILLIS.